(12) United States Patent
Koeppl et al.

(10) Patent No.: US 10,900,846 B2
(45) Date of Patent: Jan. 26, 2021

(54) APPLIANCE HAVING A TEMPERATURE-MONITORED PLUG-IN CONNECTION

(71) Applicant: BSH HAUSGERAETE GMBH, Munich (DE)

(72) Inventors: Magnus Koeppl, Donaustauf (DE); Holger Helmschmidt, Regensburg (DE); Claus Plecher, Zeitlarn (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 16/604,259

(22) PCT Filed: Mar. 21, 2018

(86) PCT No.: PCT/EP2018/057109
§ 371 (c)(1),
(2) Date: Oct. 10, 2019

(87) PCT Pub. No.: WO2018/188917
PCT Pub. Date: Oct. 18, 2018

(65) Prior Publication Data
US 2020/0149981 A1  May 14, 2020

(30) Foreign Application Priority Data

Apr. 10, 2017 (DE) .......................... 10 2017 206 094

(51) Int. Cl.
*G01K 7/02* (2006.01)
*G01K 7/08* (2006.01)
(Continued)

(52) U.S. Cl.
CPC ............. *G01K 13/00* (2013.01); *G01K 7/023* (2013.01); *G01K 7/08* (2013.01); *H01R 13/6683* (2013.01); *H01R 13/7137* (2013.01)

(58) Field of Classification Search
CPC ............ G01K 7/02; G01K 7/023; G01K 7/08; G01K 13/00; H01R 13/66; H01R 13/665;
(Continued)

(56) References Cited

U.S. PATENT DOCUMENTS 9,564,719 B1 * 2/2017 Oldham ................. H01R 43/24
10,259,331 B2    4/2019 Sauer
(Continued)

FOREIGN PATENT DOCUMENTS

| DE | 102015206840 A1 | 10/2016 |
| WO | 2006109330 A1 | 10/2006 |
| WO | 2015113666 A2 | 8/2015 |

*Primary Examiner* — Levi Gannon
(74) *Attorney, Agent, or Firm* — Laurence A. Greenberg; Werner H. Stemer; Ralph E. Locher

(57) ABSTRACT

An appliance includes an appliance interface forming a plug connection with an appliance-side interface unit of a power cable. The appliance interface includes at least one power contact part forming a power connection with a power contact part of the appliance-side interface unit supplying the appliance with electrical energy from a supply grid. The appliance interface includes a first thermoelectric element contacting a second thermoelectric element of the appliance-side interface unit, when the power connection exists. The first thermoelectric element is coupled to a first measurement input of a control unit. The appliance interface includes a measurement contact part forming a measurement connection, between the second thermoelectric element and a second measurement input of the control unit, with a measurement contact part of the appliance-side interface unit. The control unit determines measurement data relating to a measurement voltage between the first and second measurement inputs.

12 Claims, 2 Drawing Sheets

(51) Int. Cl.
*H01R 13/66* (2006.01)
*G01K 13/00* (2006.01)
*H01R 13/713* (2006.01)

(58) Field of Classification Search
CPC .............. H01R 13/6683; H01R 13/713; H01R 13/7137; H01R 31/065; H02H 5/04; H02H 5/046
See application file for complete search history.

(56) References Cited

U.S. PATENT DOCUMENTS

| | | | |
|---|---|---|---|
| 2002/0097546 A1* | 7/2002 | Weinberger | H02H 3/12 |
| | | | 361/103 |
| 2007/0006603 A1* | 1/2007 | Reusche | H01R 13/7137 |
| | | | 62/196.4 |
| 2009/0316321 A1* | 12/2009 | Ouwerkerk | B60L 53/16 |
| | | | 361/106 |
| 2013/0134933 A1* | 5/2013 | Drew | B60L 50/51 |
| | | | 320/109 |
| 2013/0336359 A1* | 12/2013 | Zink | G01K 7/023 |
| | | | 374/152 |
| 2015/0180221 A1* | 6/2015 | Leinonen | H02H 5/04 |
| | | | 361/103 |
| 2017/0001529 A1 | 1/2017 | Fuchs et al. | |
| 2017/0077656 A1* | 3/2017 | Beideman | H01R 13/7137 |
| 2017/0350766 A1* | 12/2017 | Saecker | G01K 13/00 |
| 2018/0238744 A1* | 8/2018 | Harle | G01K 7/13 |
| 2018/0351307 A1* | 12/2018 | AbuGhazaleh | H01R 13/6691 |

* cited by examiner

APPLIANCE HAVING A TEMPERATURE-MONITORED PLUG-IN CONNECTION

BACKGROUND OF THE INVENTION

Field of the Invention

The invention relates to an appliance, in particular to a household appliance, comprising a temperature-monitored plug-in connection, in particular a plug-in connection to a power cable.

A household appliance, in particular a domestic appliance, for instance a washing machine, dishwasher, washer-dryer, etc., is typically connected to an electrical supply grid via a power cable in order to supply the household appliance with electrical energy. Said power cable comprises a grid-side interface unit (in particular a power plug), by means of which the power cable is plugged into a grid interface (in particular into a socket). In addition, the power cable can comprise an appliance-side interface unit, by means of which the power cable is connected to an appliance interface (in particular to a plug of the household appliance).

The appliance-side interface unit and the appliance interface typically form a plug-in system, in which a user of a household appliance can make the plug-in connection between appliance-side interface unit and appliance interface. It can happen here that a user makes the plug-in connection only inadequately. It can also happen that the quality of the plug-in connection between appliance-side interface unit and appliance interface is inadequate as a result of ageing and/or wear. The plug-in connection can hence have a relatively high transition resistance, with the result that the temperature of the plug-in connection may rise when power is transferred via the plug-in connection.

SUMMARY OF THE INVENTION

The technical object of the present document is to provide an appliance, in particular a household appliance, and a system comprising an appliance and a power cable, by means of which the temperature of a plug-in connection between the appliance and the power cable can be monitored reliably and precisely.

The object is achieved by the subject matter of the independent claim. Advantageous embodiments are defined in particular in the dependent claims, are described in the following description, or are illustrated in the accompanying drawing.

According to one aspect of the invention, an appliance, in particular a household appliance or domestic appliance, is described which comprises an appliance interface for connecting a power cable, and comprises a control unit. The appliance, in particular the household appliance, can be designed to be used by a user in a household (in particular in a kitchen). Examples of household appliances are kitchen appliances such as, for instance, a refrigerator, a washing machine, a coffee machine, a mixer, a food processor, etc.

The appliance interface is designed to form, with an appliance-side interface unit of the power cable, a plug-in connection. In particular, one or more power contact parts of the appliance-side interface unit can form plug-in connections with complimentary one or more power contact parts of the appliance interface. A power contact part of the appliance-side interface unit of the power cable can here preferably comprise a receptacle, into which can be plugged a pin of the appliance interface of the appliance in order to form a power connection. In particular, the appliance interface of the appliance can be embodied as a plug, which can be plugged into an appliance-side interface unit of the power cable, which interface unit is embodied as a socket.

The appliance interface of the appliance thus comprises one or more power contact parts, which are designed to form, with one or more power contact parts of the appliance-side interface unit of the power cable, respective power connections (in pairs), in order to supply the household appliance with electrical energy from an electrical supply grid (e.g. from a 230V grid or a 130V grid). For this purpose, the power cable can be connected via a grid-side interface unit (e.g. via a power plug) to the supply grid (e.g. to a socket of the supply grid). Said grid-side interface unit is typically standardized (e.g. plug type F (CEE 7/4). Exemplary power connections can be provided for a neutral conductor and/or for a phase conductor.

The appliance interface, in particular the power contact part of the appliance interface for at least one of the power connections (e.g. for a neutral conductor or for a phase conductor), comprises a first thermoelectric element. Said first thermoelectric element comprises a first material or is made (if applicable, entirely) of a first material. The first material is preferably a metal. Furthermore, the first material has a first thermoelectric coefficient. For example, the first material can comprise, or be, iron (Fe).

The first thermoelectric element is designed to make contact, when the power connection exists, with a second thermoelectric element on the appliance-side interface unit, in particular on the power contact part of the appliance-side interface unit. Said second thermoelectric element comprises a second material or is made (if applicable, entirely) of a second material. The second material preferably comprises a metal. In this context, the second material differs from the first material. In particular, the second material typically has a second thermoelectric coefficient, which differs from the first thermoelectric coefficient of the first material. For example, the second material can comprise, or be, copper-nickel (CuNi).

The first thermoelectric element is coupled, for instance via a first line, to a first measurement input of the control unit in an electrically conducting manner. Said first measurement input can comprise an analog-to-digital converter in order to generate digital measurement data relating to a first potential at the first measurement input. Galvanic isolation from the power contact part of the appliance interface can thus be achieved via the first measurement input.

The appliance interface comprises a measurement contact part, which is designed to form, with a measurement contact part of the appliance-side interface unit, an electrically conducting measurement connection (in particular a plug-in connection) between the second thermoelectric element and a second measurement input of the control unit. Hence a second potential can be provided at a second measurement input of the control unit via a measurement connection. The second measurement input can comprise an analog-to-digital converter in order to provide measurement data relating to the second potential at the second measurement input. Galvanic isolation from the power contact part of the appliance-side interface unit can thus be achieved via the second measurement input.

Thus the control unit is designed to determine measurement data relating to a measurement voltage, or a potential difference, between the first measurement input and the second measurement input. As a result of using different thermoelectric elements at a power connection at the appliance interface, the measurement voltage indicates temperature information relating to the temperature at the power connection. The use of thermoelectric elements makes it possible to acquire the temperature in the immediate vicinity of the power connection. It is hence possible to determine temperature information precisely.

The first thermoelectric element can be connected via a first line to the first measurement input of the control unit in an electrically conducting manner. Both the first thermoelectric element and the first line can comprise the first material or be made (if applicable, entirely) of the first material. The measurement contact part of the appliance interface can be connected in a corresponding manner via a second line to the second measurement input of the control unit in an electrically conducting manner. Both the measurement contact part of the appliance interface and the second line can comprise the second material or be made (if applicable, entirely) of the second material. A measurement voltage can hence be provided at the measurement inputs of the control unit in a precise manner, wherein said measurement voltage indicates information relating to the temperature at the thermoelectric elements that are in contact with one another.

The control unit can be designed to initiate on the basis of the measurement data (at least) one measure relating to the one or more power connections of the appliance, in particular relating to the temperature or the heat generation at the one or more power connections. Examples of measures in this case are: outputting an indication relating to the temperature of the one or more power connections via an output unit (e.g. on a screen) of the appliance; reducing a power consumption of the appliance via the one or more power connections; and/or bringing the appliance into a safe operating state.

The appliance can hence be designed to monitor the temperature of the plug-in connection to a power cable, and, if necessary, to initiate one or more countermeasures. The security, reliability and convenience of an appliance can be increased further thereby.

According to another aspect of the invention, a system is described comprising an appliance, in particular a household appliance, and a power cable. Said appliance can be designed as described in this document. The power cable comprises an appliance-side interface unit, which is connected via lines to a grid-side interface unit for connecting the power cable to an electrical supply grid. The appliance can thereby be connected via the power cable to the electrical supply grid. For this purpose, the appliance-side interface unit of the power cable comprises power contact parts, which are designed to form power connections with power contact parts of the appliance interface.

The appliance-side interface unit and the appliance interface comprise means (in particular one or more thermocouples) which can be used to acquire temperature information relating to the temperature or the heat generation of the plug-in connection between the appliance-side interface unit and the appliance interface.

In particular, the appliance-side interface unit comprises a second thermoelectric element (made of a second material), which is designed to make contact, when a power connection exists between the corresponding power contact parts of the appliance-side interface unit and the interface unit, with the first thermoelectric element (made of a first material) of the appliance interface.

In addition, the appliance-side interface unit can comprise a measurement contact part (in particular made of the second material), which is coupled to the second thermoelectric element and is designed to form, with the measurement contact part of the appliance interface, the measurement connection.

The system can thus comprise a first electrically conducting connection made of the first material from the first thermoelectric element up to the first measurement input.

In addition, the system can comprise a second electrically conducting connection made of the second material from the second thermoelectric element via the measurement connection up to the second measurement input. It is hence possible to provide a thermocouple (for one, or for each of a plurality, of the power connections), which is designed to acquire the temperature in the immediate vicinity of a power connection. The first thermoelectric element and the second thermoelectric element can have for this purpose a direct junction between each other in a portion of a power connection between the power contact parts.

The appliance-side interface unit can comprise a spring, on which is arranged the second thermoelectric element. Said spring can be electrically isolated, in particular electrically insulated, from the power contact part of the appliance-side interface unit. The first thermoelectric element can be arranged on a side of the power contact part of the appliance interface that faces the spring of the appliance-side interface unit (and, if applicable, can be in electrical contact with the power contact part of the appliance interface). For example, the first thermoelectric element and/or the second thermoelectric element can be provided as a coating on the associated power contact part, wherein the coatings of the two power contact parts can touch in a certain portion of the power connection.

It should be noted that many different combinations of any of the aspects of the appliance and/or system described in this document are possible. In particular, the features of the claims can be combined with one another in a variety of ways.

BRIEF DESCRIPTION OF THE SEVERAL VIEWS OF THE DRAWING

In addition, the invention is described in greater detail below with reference to exemplary embodiments illustrated in the accompanying drawing, in which.

DESCRIPTION OF THE INVENTION

Figure 1:
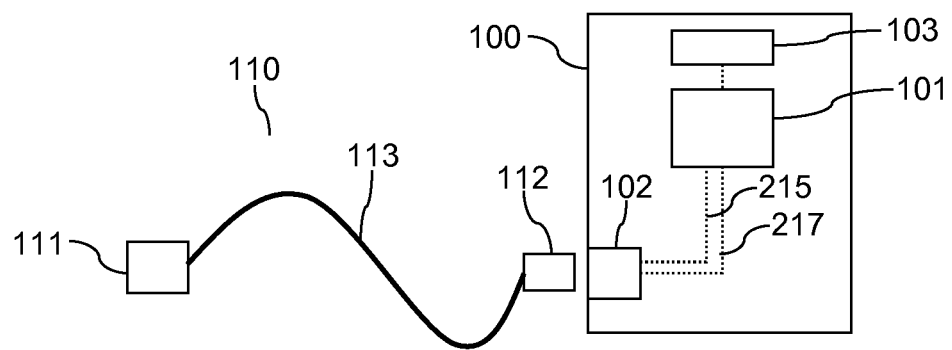
FIG. 1 shows a block diagram of a household appliance and of a power cable.

As presented in the introduction, the present document is concerned with the reliable and precise monitoring of the temperature of a plug-in connection between a power cable and an electrical appliance, in particular a household appliance. FIG. 1 shows an appliance 100, in particular a household appliance, which can be connected via an appliance interface 102 (e.g. a plug) to the appliance-side interface unit 112 (e.g. a receptacle) of a power cable 110. The power cable 110 comprises electrical lines 113, which connect the appliance-side interface unit 112 to a grid-side interface unit 111. The appliance 100 comprises a control unit 101, which is designed to receive information relating to a plug-in connection between appliance-side interface unit 112 and appliance interface 102 from the appliance interface 102 (via one or more lines 215, 217). The control unit 101 is further designed to control the appliance 100 on the basis of the received information. For example, a visual and/or audible signal can be output via an output unit 103 of the household appliance 100 in order to inform a user of the appliance 100 about the temperature of the plug-in connection.

Figure 2:
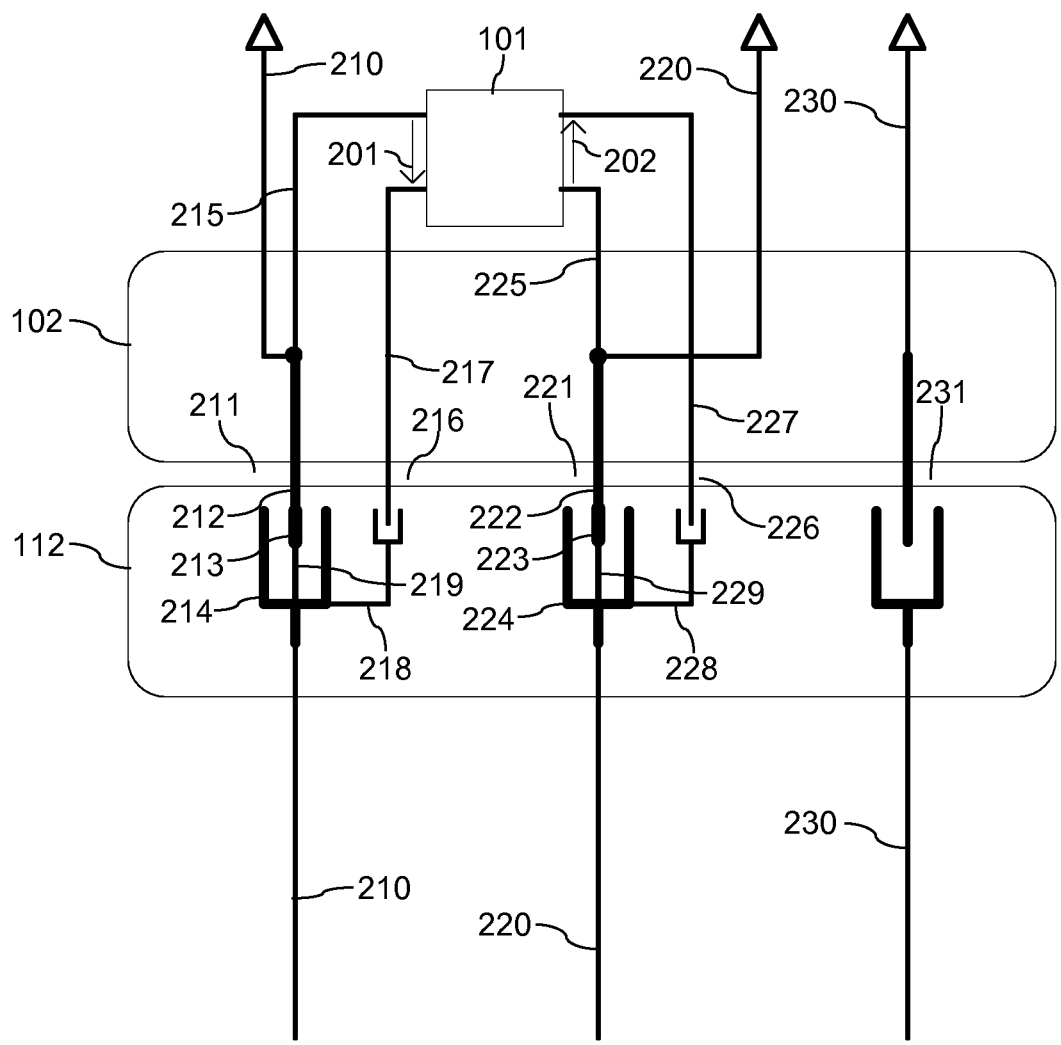
FIG. 2 shows an example of a plug-in system comprising means for determining information relating to a temperature of contact parts of the plug-in system.

The plug-in connection between the appliance-side interface unit 112 and the appliance interface 102 can comprise means which can be used to acquire and indicate the temperature of the plug-in connection. FIG. 2 shows details of an example of a plug-in connection between an appliance 100 and a power cable 110. The plug-in connection is designed to make a plurality of power connections 211, 221, 231 in order to transfer electrical energy for supplying power to the appliance 100. In particular, a power connection 211 can be made for a neutral conductor N 210, a power connection 221 can be made for a phase conductor 220, and a power connection 231 can be made for a protective ground conductor 230. The appliance interface 102 and the appliance-side interface unit 112 each comprise contact parts for this purpose. In the example shown, the appliance interface 102 comprises pins or blades 212, 222, which can be plugged into corresponding receptacles 214, 224 of the appliance-side interface unit 112 in order to make the respective power connections 211, 221. The pins or blades 212, 222 and receptacles 214, 224 for making a power connection 211, 221 are referred to in this document in general as power contact parts.

An inadequate electrical contact made between the contact parts of a power connection 211, 221 can result in a higher transition resistance and hence a substantial rise in temperature at the contact parts. The plug-in connection shown in FIG. 2 comprises means for acquiring the temperature of a power connection 211, 221 in a precise manner. In particular, the power contact part 212, 222 of the appliance interface 102 comprises a first thermoelectric element 213, 223, and the appliance-side interface unit 112 (in particular the power contact part 214, 224 of the appliance-side interface unit 112) comprises a second thermoelectric element 219, 229, which are in contact with one another at the power connection 211, 221, or in the immediate vicinity of the power connection 211, 221, with the result that a voltage is produced because of the junction between the first thermoelectric element 213, 223 and the second thermoelectric element 219, 229, with the height of said voltage depending on the temperature at the junction between the first thermoelectric element 213, 223 and the second thermoelectric element 219, 229.

The first thermoelectric element 213, 223 is coupled via a first line 215, 225 to a first measurement input of the control unit 101. In addition, the second thermoelectric element 219, 229 is coupled to a second measurement input of the control unit 101 via a second line 218, 228 inside the appliance-side interface unit 112, via a second line 217, 227 inside the appliance interface 102, and via a signal connection 216, 226 between the second lines of the appliance-side interface unit 112 and of the appliance interface 102. A measurement voltage 201, 202 between the first measurement input and the second measurement input, which indicates the temperature of the junction between the first thermoelectric element 213, 223 and the second thermoelectric element 219, 229, can hence be acquired at the control unit 101.

The first thermoelectric element 213, 223 and the second thermoelectric element 219, 229 comprise different materials, in particular different metals, wherein the different materials have different thermoelectric coefficients $k_1$ and $k_2$ respectively. The measurement temperature $T_M$ at the junction typically is different from a reference temperature $T_R$, wherein the reference temperature can be, for instance, the temperature at the measurement inputs of the control unit 101. The measurement voltage $U_M$, which is acquired at the measurement inputs, is then given by:

$$U_M=(k_1-k_2)*(T_M-T_R).$$

Thus if the thermoelectric coefficients and the reference temperature are known, the temperature can be acquired directly at a power connection 211, 221 in a precise manner on the basis of the measurement voltage. For this purpose, the first thermoelectric element 213, 223 and the first line 215, 225 are formed from the first material having the first thermoelectric coefficient $k_1$. In addition for this purpose, the second thermoelectric element 219, 229, the second lines 218, 228 and 217, 227, and the signal connection 216, 226 are formed from the second material having the second thermoelectric coefficient $k_2$.

Figure 3:
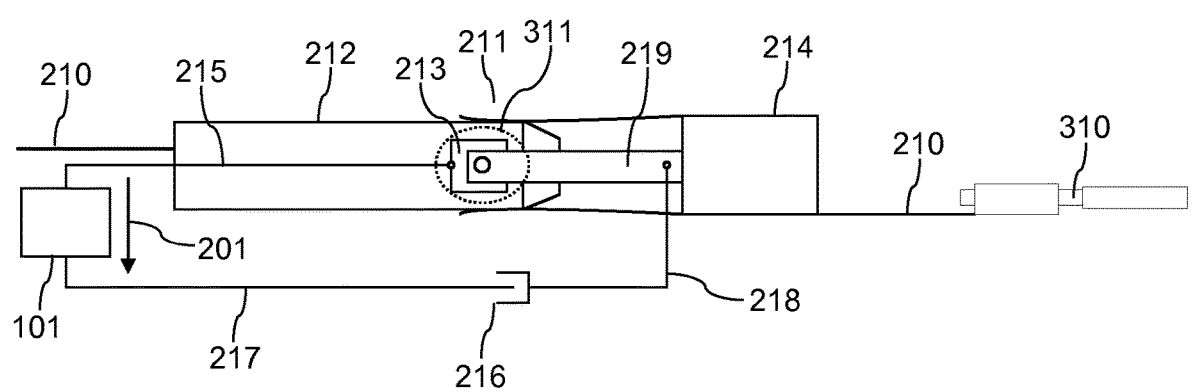
FIG. 3 shows an example of a plug-in connection comprising temperature monitoring.

The first thermoelectric element 213, 223 can be integrated in the power contact part 212, 222 of the appliance interface 102. For example, the first thermoelectric element 213 may be arranged, as shown in FIG. 3, for instance in portions on at least one power contact part 212 of the appliance interface 102. In a corresponding manner, the second thermoelectric element 219, 229 can also be arranged at least in portions on a power contact part 214, 224 of the appliance-side interface unit 112. The junction 311 between the first thermoelectric element 213, 223 and the second thermoelectric element 219, 229 can then lie in a specific portion of the power connection 211. FIG. 3 also shows a line 310 of the power cable 110 by way of example.

Thus a plug-in connection having a plurality of power connections 211, 221 is described, wherein at least one power connection 211, 221 comprises a thermocouple for determining temperature information relating to the temperature of the power connection 211, 221. The thermocouple for a power connection 211 comprises two different thermoelectric elements 213, 219, which form, for instance in a portion of the power connection 211, a junction 311 between each other. The thermoelectric voltage (i.e. the measurement voltage 201, 202) can be acquired via the measurement inputs of a control unit 101 (e.g. of a microcontroller). Then the control unit 101 can initiate on the basis of the measurement voltage 201, 202, one or more measures for reducing the temperature.

The first thermoelectric element 213 comprises a first material (e.g. iron, Fe) having a first thermoelectric coefficient. In addition, the first thermoelectric element 213 is coupled to the first measurement input of the control unit 101 via a first line 215, said first line 215 likewise comprising the first material. The second thermoelectric element 219 is coupled to the second measurement input of the control unit 101 via the second lines 217, 218 and via a plug-in connection 216 (for coupling the second lines 217, 218), wherein the second material (e.g. copper-nickel, CuNi) having the second thermoelectric coefficient is used in each case.

The measures described in this document can be used to monitor the temperature of a plug-in connection to a household appliance reliably and precisely. In this process, the temperature can be measured directly at a power connection 211, i.e. directly at the contact parts 212, 214 of a power connection 211. Moreover, the temperature measurement can take place during operation of an appliance 100. It is hence possible to prevent excessive heating of the plug-in connection. The described measures comprise galvanic isolation from the appliance power supply and hence can be implemented safely. The existence of a raised temperature of the plug-in connection can be indicated to a user at an output unit 103 of the appliance 100, so that the user can take suitable countermeasures. In addition, measures can be implemented promptly automatically in the appliance 100 in order to bring the appliance 100 into a safe operating state.

The present invention is not limited to the exemplary embodiments shown. In particular, it should be noted that the description and the figures are intended solely to illustrate the principle of the proposed appliance and/or system.

The invention claimed is:

1. An appliance to be connected to a power cable, the appliance comprising:
   a control unit having a first measurement input and a second measurement input;
   an appliance interface configured to form a plug-in connection with an appliance-side interface unit of the power cable;
   said appliance interface including at least one power contact part configured to form a power connection with a power contact part of the appliance-side interface unit to supply the appliance with electrical energy from an electrical supply grid;
   said appliance interface including a first thermoelectric element configured to make contact with a second thermoelectric element of the appliance-side interface unit when said power connection exists;
   said first thermoelectric element being coupled to said first measurement input of said control unit;
   said appliance interface including a measurement contact part configured to form a measurement connection between the second thermoelectric element and said second measurement input of said control unit with a measurement contact part of the appliance-side interface unit; and
   said control unit being configured to determine measurement data relating to a measurement voltage between said first measurement input and said second measurement input.

2. The appliance according to claim 1, wherein:
   said first thermoelectric element includes a first material having a first thermoelectric coefficient;
   the second thermoelectric element and said measurement contact part of said appliance interface include a second material having a second thermoelectric coefficient; and
   the first thermoelectric coefficient and the second thermoelectric coefficient are different.

3. The appliance according to claim 1, which further comprises at least one of:
   a first line connecting said first thermoelectric element to the first measurement input of the control unit, said first thermoelectric element and said first line each including a first material; or
   a second line connecting said measurement contact part of said appliance interface to said second measurement input of said control unit, said measurement contact part of said appliance interface and said second line each including a second material.

4. The appliance according to claim 1, wherein said control unit is configured to initiate a measure relating to said power connection, based on the measurement data.

5. The appliance according to claim 4, wherein said measure relating to said power connection is a temperature of said power connection.

6. The appliance according to claim 4, which further comprises
   an output unit;
   said measure including at least one of:
     outputting an indication at said output unit relating to said power connection; or
     reducing a power consumption of the appliance through said power connection; or
     bringing the appliance into a safe operating state.

7. The appliance according to claim 1, wherein said first thermoelectric element is disposed on said power contact part of said appliance interface.

8. The system according to claim 7, wherein:
   said first thermoelectric element is disposed on said power contact part of said appliance interface; and
   said appliance-side interface unit includes the measurement contact part being coupled to said second thermoelectric element and configured to form said measurement connection with said measurement contact part of said appliance interface.

9. A system, comprising:
   an appliance according to claim 1;
   a grid-side interface unit; and
   a power cable including an appliance-side interface unit and lines connecting said appliance-side interface unit to said grid-side interface unit for connecting said power cable to an electrical supply grid;
   said appliance-side interface unit of said power cable including at least one power contact part configured to form a power connection with said power contact part of said appliance interface.

10. The system according to claim 9, wherein said first thermoelectric element and said second thermoelectric element form a direct junction therebetween in a portion of said power connection between said power contact parts.

11. The system according to claim 9, wherein:
    said power contact part of said appliance interface includes a pin; and
    said power contact part of said appliance-side interface unit includes a receptacle into which said pin of said appliance interface can be plugged.

12. The system according to claim 9, wherein:
    said appliance-side interface unit includes a spring on which said second thermoelectric element is disposed; and
    said first thermoelectric element is disposed on a side of said power contact part of said appliance interface facing said spring of said appliance-side interface unit.

* * * * *